(12) United States Patent
Matsumoto et al.

(10) Patent No.: US 11,114,210 B2
(45) Date of Patent: Sep. 7, 2021

(54) CONTROL ROD OPERATION MONITORING METHOD AND CONTROL ROD OPERATION MONITORING SYSTEM

(71) Applicant: HITACHI-GE NUCLEAR ENERGY, LTD., Ibaraki (JP)

(72) Inventors: Koji Matsumoto, Ibaraki (JP); Kazuya Ishii, Ibaraki (JP); Takao Kondou, Ibaraki (JP); Akira Konoma, Ibaraki (JP); Akiyuki Tsuchiya, Ibaraki (JP)

(73) Assignee: HITACHI-GE NUCLEAR ENERGY, LTD., Hitachi (JP)

( * ) Notice: Subject to any disclaimer, the term of this patent is extended or adjusted under 35 U.S.C. 154(b) by 354 days.

(21) Appl. No.: 16/074,117

(22) PCT Filed: Nov. 25, 2016

(86) PCT No.: PCT/JP2016/084879
§ 371 (c)(1),
(2) Date: Jul. 31, 2018

(87) PCT Pub. No.: WO2017/154275
PCT Pub. Date: Sep. 14, 2017

(65) Prior Publication Data
US 2019/0214157 A1 Jul. 11, 2019

(30) Foreign Application Priority Data
Mar. 9, 2016 (JP) .............................. JP2016-045726

(51) Int. Cl.
*G21C 17/108* (2006.01)
*G21C 7/36* (2006.01)
(52) U.S. Cl.
CPC ............. *G21C 17/108* (2013.01); *G21C 7/36* (2013.01); *Y02E 30/30* (2013.01)

(58) Field of Classification Search
CPC ................................ G21C 7/36; G21C 17/108
See application file for complete search history.

(56) References Cited

U.S. PATENT DOCUMENTS 3,932,211 A * 1/1976 Loving, Jr. .......... G21C 17/108
376/255
4,333,797 A * 6/1982 Nishizawa ........... G21C 17/108
376/210
(Continued)

FOREIGN PATENT DOCUMENTS

JP 01-253695 A 10/1989
JP 2012-163438 A 8/2012

OTHER PUBLICATIONS

International Search Report of PCT/JP2016/084879 dated Mar. 14, 2017.

*Primary Examiner* — Sharon M Davis
(74) *Attorney, Agent, or Firm* — Mattingly & Malur, PC

(57) ABSTRACT

A control rod operation generates a rod insertion block signal during operation of a reactor. Four neutron detector assemblies including a plurality of LPRMs arranged in an axial direction of a core are arranged adjacent to a plurality of insertion selection control rods, respectively, which are simultaneously inserted into the core. Neutron flux ratio calculation units are arranged in each of the neutron detector assemblies, and ratios (neutron flux ratios $B_A/A_A$, $C_A/A_A$, and $D_A/A_A$) of an average LPRM signal of the respective LPRMs at positions B, C, and D to an average LPRM signal of the respective LPRMs at a position A which is closest to the control rod insertion end of the core are calculated. When the largest neutron flux ratio out of the neutron flux ratios exceeds a set neutron flux ratio, a rod insertion block signal which is generated by a local range rod insertion monitor is output.

6 Claims, 3 Drawing Sheets

(56) References Cited

U.S. PATENT DOCUMENTS

| | | | | |
|---|---|---|---|---|
| 5,555,279 A | * | 9/1996 | Nir | G21C 17/00 376/216 |
| 6,339,629 B1 | * | 1/2002 | Takeuchi | G21C 17/108 376/254 |
| 2001/0026603 A1 | * | 10/2001 | Hirukawa | G21C 17/108 376/255 |
| 2013/0058447 A1 | * | 3/2013 | Takeuchi | G21C 17/00 376/241 |
| 2013/0177119 A1 | * | 7/2013 | Kiuchi | G06F 11/267 376/215 |
| 2013/0188765 A1 | * | 7/2013 | Yoshida | G21D 3/001 376/217 |

* cited by examiner

CONTROL ROD OPERATION MONITORING METHOD AND CONTROL ROD OPERATION MONITORING SYSTEM

TECHNICAL FIELD

The present invention relates to a control rod operation monitoring method and a control rod operation monitoring system, and more particularly, to a control rod operation monitoring method and a control rod operation monitoring system which are suitable for applying to a boiling water reactor and can monitor an insertion operation of a control rod.

BACKGROUND ART

In a boiling water reactor, it is common to monitor an operation of a control rod, specifically, a withdrawal operation of the control rod. The withdrawal operation of the control rod is monitored by using a rod block monitor to which an output signal from a local power range monitoring system (LPRM) which is a kind of neutron detector arranged in a core is input.

A plurality of fuel assemblies are loaded in the core present in a reactor pressure vessel of a boiling water reactor. The core has a plurality of cells which include a single control rod and four fuel assemblies arranged around the control rod. A plurality of LPRM assemblies including the LPRM are a single fuel assembly included in each of the four cells adjacent to each other, and are each arranged in a part of a region (region into which a control rod is not inserted) surrounded by corner parts of four fuel assemblies adjacent to each other. Specifically, when folded at a diagonal line of the core in consideration of ½ symmetry with respect to the diagonal line of the core, the LPRM assemblies are configured to be loaded at all positions of an opposite angle at which the control rod is loaded. Each LPRM assembly includes a tube and four LPRMs arranged at four positions A, B, C, and D, respectively, which are different positions in an axial direction of the core, within the tube. Of positions A, B, C and D, the position A is located at the lowest position, and the positions B, C and D are located high in order in the axial direction of the core.

A control rod withdrawn from the core is selected to increase the power of the reactor during the operation of the boiling water reactor. The withdrawal of the control rod is performed by a single mode in which a single control rod is withdrawn or a gang mode in which a plurality of control rods are withdrawn simultaneously.

As described in JP H1-253695 A, when the control rod to be withdrawn from the core is selected, four LPRM assemblies, which exist around the selected control rod and are adjacent to the control rod, are selected and the respective signals output from a total of eight LPRMs located at the positions A and C in the selected four LPRM assemblies are input to one channel of a rod block monitor and averaged. Further, the respective signals (LPRM signals) output from the total of eight LPRMs located at the positions B and D in four LPRM assemblies are input to another channel of the rod block monitor and averaged. When either the average of the LPRM signals obtained on the former channels (A and C) or the average of the LPRM signals obtained on the latter channels (B and D) exceeds a setpoint, the rod block monitor outputs a rod withdrawal block signal, which blocks the withdrawal of the selected control rod, to a control rod driver which operates the selected control rod. The control rod driver stops the driving, and thus the withdrawal of the selected control rod is blocked.

The rod block monitor as described above has a function of suppressing an abnormal power of the fuel assembly adjacent to the control rod to be withdrawn from increasing upon the withdrawal operation of the control rod in order to increase the power of the reactor and preventing a failure of fuel rods included in the fuel assembly. From the viewpoint of preventing the failure of the fuel rods due to the increase in power, the rod block monitor monitors only the control rod to be withdrawn at which the power of the reactor is increased.

An example of the control rod operation monitoring device having a function of blocking the control rod from being inserted into the core is disclosed in JP 2012-163438 A. The control rod operation monitoring device also has a function of blocking the withdrawal of the control rod from the core.

In the reactor, a cold criticality test, in which the plurality of control rods are withdrawn to make the reactor locally critical in a short period of time, is carried out while the operation of the reactor is stopped. In the cold criticality test, a reactivity charging amount is limited upon the withdrawal of the control rod of one notch, and when the reactivity charging amount exceeds the limit, a dispersion operation is carried out before the control rod of one notch is withdrawn. The dispersion operation means an operation of withdrawing another control rod, assigning a small reactivity worth to the withdrawn control rod, and confirming the assigned reactivity worth prior to performing a withdrawal operation of a control rod with a large reactivity worth, and if there is no problem, inserting the another control rod and then withdrawing the control rod with the large reactivity worth. In the dispersing operation, both the withdrawal operation of the control rod and the insertion operation of the another control rod are performed.

As described in JP 2012-163438 A, when the control rod to be inserted is differently selected from the sequence in the dispersion operation, the control rod operation monitoring device blocks the selected control rod from being inserted into the core. In addition, if the control rod to be withdrawn is differently selected from the sequence in the dispersion operation, the control rod operation monitoring device blocks the selected control rod from being withdrawn from the core.

CITATION LIST

Patent Literature

PTL 1: JP H1-253695 A
PTL 2: JP 2012-163438

SUMMARY OF INVENTION

Technical Problem

The insertion of the control rod into the core during operation of the reactor decreases the power of the reactor, so there is little risk of the failure of the fuel rods. However, even in the case of inserting the control rod into the core, when many control rods are inserted simultaneously, a power distribution is distorted in the axial direction of the core and power of an upper part of the core into which the control rod is not inserted is increased, such that there is a possibility of the failure of the fuel rod at the upper part. Therefore, it is preferable to monitor the local increase in power due to the incorrect insertion operation of the control rod even at the time of the insertion of the control rod and block the insertion of the control rod when there is a possibility of the failure of the fuel rod.

In the above-mentioned rod block monitor, if the control rod to be withdrawn is selected, as described above, the LPRM signals from the eight LPRMs located at the positions A and C adjacent to the selected control rod on one channel (A and C) are averaged, and the LPRM signals from the eight LPRMs located at the positions B and D adjacent to the selected control rod on another channel (B and D) are averaged. The values of the LPRM signals averaged on each of these two channels is normalized to be a value of an output signal of an average power range monitor (APRM). For example, if the power of the reactor before the withdrawal of the selected control rod is 100% of rated power, the respective values averaged on the two channels described above of the rod block monitor become 100%. If the value averaged on any of the channels becomes, for example, 105% by the withdrawal operation of the control rod, the withdrawal of the selected control rod is blocked.

The inventors newly found that in the rod block monitor which blocks the withdrawal of the control rod when any of the LPRM signals averaged on each of the two channels exceeds the setpoint, when the idea of blocking the withdrawal of the control rod is applied to blocking the insertion of the control rod, the following problems occur.

That is, when the plurality of control rods are simultaneously inserted into the core, the power of the upper part of the core is increased, but the power of the lower part of the core is decreased. For this reason, when the respective LPRM signals at the positions A and C are averaged and the respective LPRM signals at the positions B and D are averaged, it becomes difficult to detect the increase in power, and it becomes impossible to properly block the insertion of the control rod.

Further, in the case in which the power of the upper part of the core is increased by the insertion operation of the control rod, for example, in the case in which the change range of the average value is small like when the values of the LPRM signals averaged on the channel changes from 100% to 105%, the LPRM signals are fluctuated and thus the averaged values of the LPRM signals exceed the setpoint, such that the control rod may be blocked from being inserted into the core. That is, if there is no influence of the fluctuation of the LPRM signals, it is likely to erroneously block the appropriate insertion operation of the control rod upon the normal operation of the reactor due to the influence of the fluctuation of the LPRM signal even if the insertion of the control rod into the core is continued.

For this reason, there is a need to prevent the erroneous block of the insertion operation of the control rod by making the accurate determination as to whether to block the control rod from being inserted upon the normal operation of the reactor.

An object of the present invention is to provide a control rod operation monitoring method and a control rod operation monitoring system capable of improving determination accuracy of a generation of a rod insertion block signal during an operation of a reactor.

Solution to Problem

The object of the present invention can be achieved by calculating first neutron flux ratios which are ratios of neutron fluxes measured by other neutron detectors located at second positions on the other end side of a core relative to neutron detectors, which are located at first positions closest to a control rod insertion end of the core among a plurality of neutron detectors which are included in neutron detector assemblies adjacent to insertion selection control rods inserted into the core and arranged in an axial direction of the core, with respect to the neutron fluxes measured by the neutron detectors, and generating a rod insertion block signal for the insertion selection control rod when the first neutron flux ratio exceeds a set neutron flux ratio.

A neutron flux ratio which is a ratio of neutron flux measured by another neutron detector located at a second position with respect to a neutron flux measured by a neutron detector located at a first position is calculated, and when the calculated neutron flux ratio exceeds the set neutron flux ratio, a rod insertion block signal for an insertion selection control rod is generated, such that it is possible to improve the determination accuracy of the generation of the rod insertion block signal during the operation of the reactor and reduce the erroneous generation of the rod insertion block signal.

Advantageous Effects of Invention

According to the present invention, it is possible to improve the determination accuracy on the generation of the rod insertion block signal during the operation of the reactor and reduce the erroneous generation of the rod insertion block signal.

DESCRIPTION OF EMBODIMENTS

Figure 1:
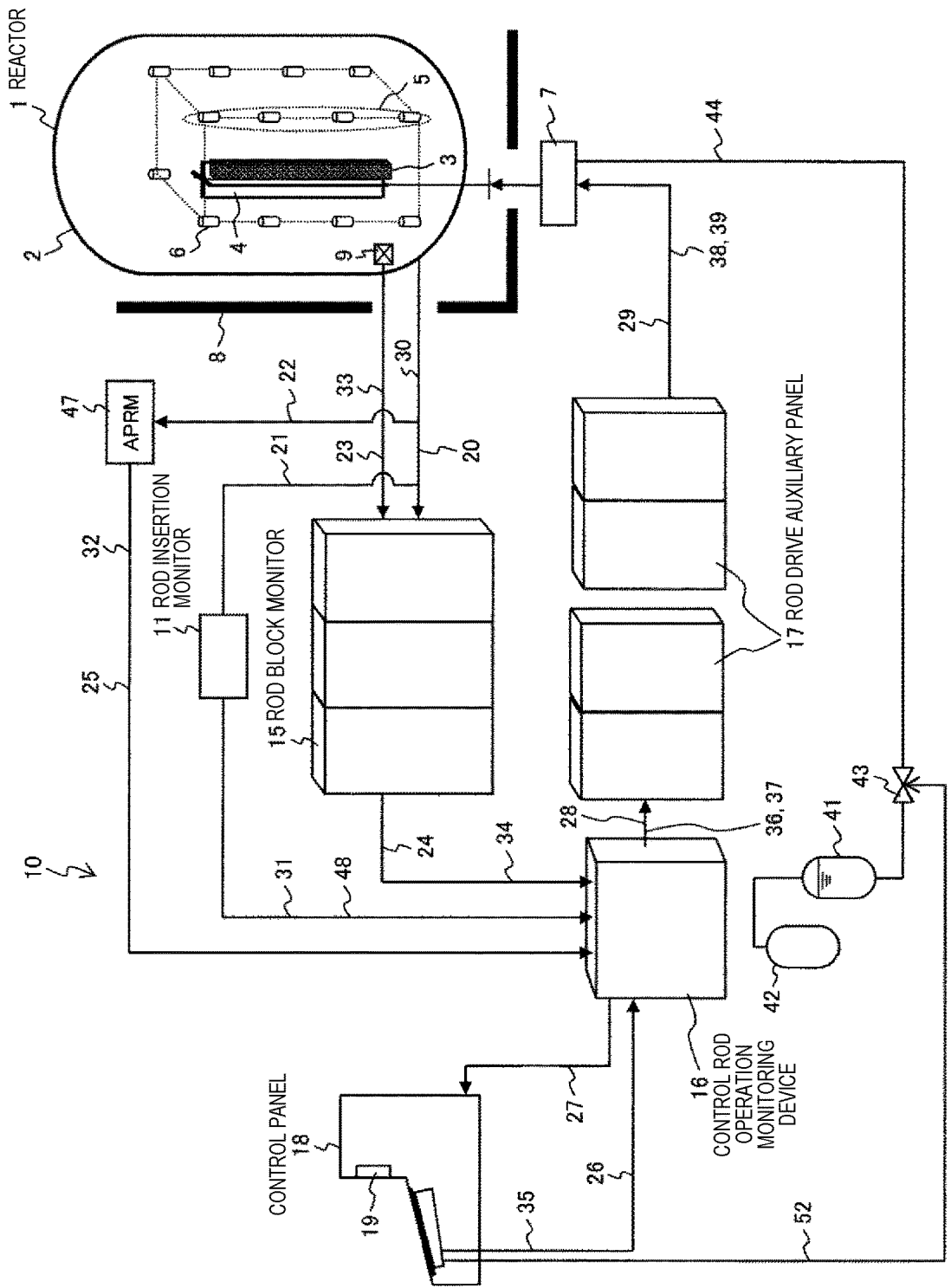
FIG. 1 is a configuration diagram showing a control rod operation monitoring system according to a first embodiment which is a preferred embodiment of the present invention.

The present inventors conducted various reviews on a measure for improving problems arising when an idea of blocking a withdrawal of a control rod is applied to insertion block of a control rod in a rod block monitor. The review results will be described below.

As described above, to avoid a failure of a fuel rod during an operation of a reactor, a rod block monitor is installed, and when any of LPRM signals averaged on two channels, respectively, exceeds a setpoint, it is common for the rod block monitor to block a withdrawal of the selected control rod.

Although it is little likely to locally increase power of a core upon an insertion of a control rod in a single mode (one) or a gang mode (four or eight) during a normal operation, when all control rods or substantially the same number of control rods as all the control rods are simultaneously inserted by a motor-driven control rod drive with some causes, it is likely to locally increase the power of the core. Even when all the control rods are inserted, it is possible to avoid the local increase in power by sequentially inserting the control rods with a time difference for each appropriate number. When the power of the core locally exceeds the setpoint due to the insertion of the control rod, in order to avoid the failure of the fuel rod, there is a need to block the insertion of the control rod which is inserted and operated. The above two problems arise in the case of applying the idea of blocking the withdrawal of the control rod to the insertion block of the control rod. That is, the first problem is that it is difficult to detect the increase in power by averaging an LPRM signal (LPRM signal at position A or LPRM signal at position B) of a lower part of the core and an LPRM signal (LPRM signal of position C or LPRM signal of position D) of an upper part of the core. In addition, the second problem is that when the change range of the average value of the LPRM signals is small, the LPRM signals are fluctuated and thus the averaged values of the LPRM signals exceed the setpoint, such that the normal control rod may be erroneously blocked from being inserted into the core.

To improve these problems, the present inventors conducted various studies on what measures can be taken to accurately block the insertion operation of the control rod into the core during the operation of the reactor. By these studies, the inventors were able to obtain one knowledge. This knowledge is obtained by paying attention to the phenomenon that power in an axial direction of a fuel assembly which is arranged adjacent to the inserted selection control rod and around the selection control rod becomes low at apart adjacent to the part into which the selection control rod is inserted, of the fuel assembly, and the lowest output thereof was hardly changed by the degree of insertion of the control rod into the core.

For example, in a boiling water reactor, a control rod is inserted into a core from below. For this reason, in a boiling water reactor, the power in the axial direction in the fuel assembly which is arranged adjacent to the inserted selection control rod and around the selection control rod is reduced earlier on a lower end side of the core of the fuel assembly. In addition, in a pressurized water reactor, the control rod is inserted into a core from above. For this reason, in the pressurized water reactor, the power in the axial direction in the fuel assembly which is arranged adjacent to the inserted selection control rod and around the selection control rod is reduced earlier on an upper end side of the core of the fuel assembly.

By paying attention to such a phenomenon, in the state in which the control rod is inserted into the core, based on a ratio of the power (hereinafter, for convenience of explanation, power at a non-adjacent part of the fuel assembly) at the part not adjacent to the part into which the selection control rod is inserted, of the fuel assembly adjacent to the inserted selection control rod and existing around the control rod with respect to the power at the part adjacent to the part into which the selection control rod is inserted on the side of the control rod insertion end (the lower end of the core in the boiling water reactor and the upper end of the core of the pressurized water reactor) of the core, of the fuel assembly adjacent to the inserted selection control rod and existing around the control rod, with reference to the power at the part of the fuel assembly, it is possible to obtain new knowledge that it is preferable to determine whether to block the insertion of the selection control rod.

The power of the adjacent part of the fuel assembly corresponds to a neutron flux which is detected by a neutron detector adjacent to the insertion part of the insertion selection control rod into the core in a neutron detector assembly including a plurality of neutron detectors arranged adjacent to the insertion selection control rod. In addition, the power of the non-adjacent part of the fuel assembly corresponds to a neutron flux which is detected by a neutron detector not adjacent to the insertion part of the insertion selection control rod into the core in the neutron detector assembly.

The power (LPRM signal at the position A or LPRM at the position B) of the lower part of the core and the power (LPRM signal of the position C or LPRM signal at the position D) of the upper part of the core need not be averaged by determining whether to output the rod insertion block signal based on the ratio of the power of the non-adjacent part of the fuel assembly with respect to the power of the adjacent part of the fuel assembly, thereby solving the first problem, and furthermore, when all control rods or substantially the same number of control rods as all the control rods are simultaneously inserted by FMCRD, since the axial power distribution is abnormally distorted and thus a power ratio for exciting the insertion block signal can be set to be a large value, it is difficult to reach the setpoint in the case of the normal insertion operation even if there is the fluctuation, so it is possible to suppress the generation of the rod insertion block signal due to the influence of the fluctuation, thereby solving the second problem.

An embodiment of the present invention based on the above new knowledge will be described below.

First Embodiment

A control rod operation monitoring method according to a first embodiment of the present invention which is a preferred embodiment of the present invention will be described below with reference to the accompanying drawings.

First, an outline of an improved boiling water reactor (ABWR) to which the control rod operation monitoring method of the first embodiment is applied will be described with reference to FIG. 1. A reactor 1 includes a reactor pressure vessel 2, a core (not shown) loaded with a plurality of fuel assemblies 3, and a plurality of control rods 4. The core loaded with these fuel assemblies 3 is arranged in the reactor pressure vessel 2. In the ABWR, for example, 191 control rods are installed. The control rod 4 is loaded in the core and inserted between the fuel assemblies 3 adjacent to each other, and four fuel assemblies 3 surrounds a circumference of each control rod 4. Each control rod 4 is separately connected to the motor-driven control rod drive (hereinafter, referred to as CRD) 7. The CRD 7 is driven by high-pressure driving water, not by a motor when rapidly inserting the control rod 4 into the core at the time of scram. The CRD is installed in a housing (not shown) of the control rod drive which is attached to a bottom part of the reactor pressure vessel 2, and performs an insertion operation of the control rod 4 into the core and a withdrawal operation of the control rod 4 from the core. A plurality of LPRM assemblies 5 which include four local power range monitoring systems (hereinafter, referred to as LPRM) 6 arranged in an axial direction of the core are located at a position at which the operation of the control rod 4 between the fuel assemblies 3 within the core is not disturbed. Each LPRM 6 is the neutron detector, and the LPRM assembly 5 including the plurality (for example, four) of LPRMs 6 arranged in the axial direction of the core is the neutron detector assembly. When folded at a diagonal line of the core in consideration of ½ symmetry with respect to the diagonal line of the core, these LPRM assemblies 5 are configured to be loaded at all positions of an opposite angle at which the control rod is loaded. A core flow detector 9 is installed in the reactor pressure vessel 2. As shown in FIG. 2, within tubes (not shown) of each LPRM assembly 5, four LPRMs 6 are located at each of the positions A, B, C, and D from a lower end of the core toward an upper end of the core.

Figure 2:
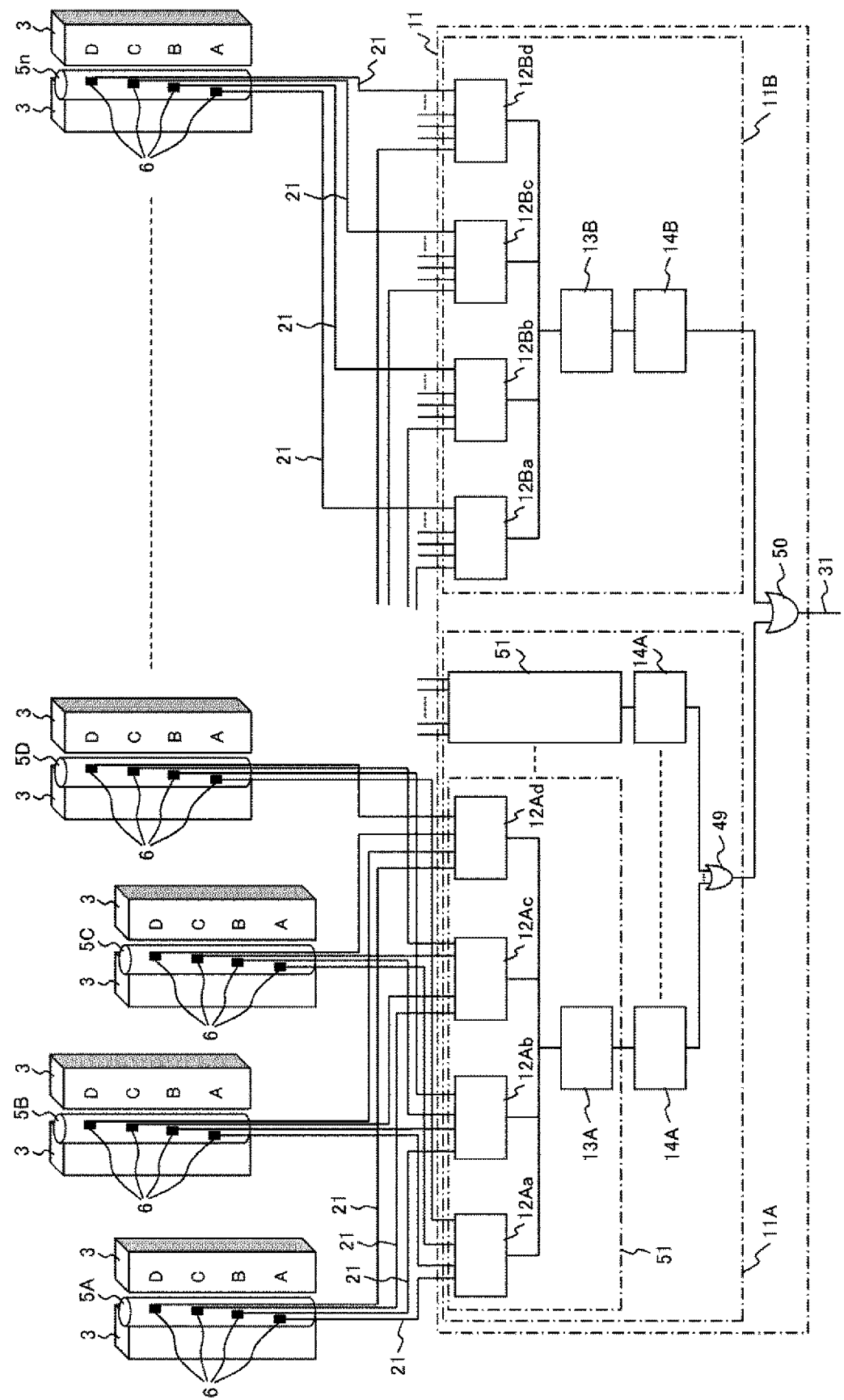
FIG. 2 is a detailed configuration diagram of a rod insertion monitor shown in FIG. 1.

As shown in FIG. 1, a control rod operation monitoring system 10 used in the control rod operation monitoring method of the first embodiment includes a rod insertion monitor 11, a rod block monitor 15, a control rod operation monitoring device 16, and a rod drive auxiliary panel 17.

Wirings 20 connected to each LPRM 6 one by one are connected to the rod block monitor 15. Each wiring 22 connected to the wirings 20 connected to each LPRM 6 one by one is connected to an average power range monitor (hereinafter referred to as APRM) 47. The core flow detector 9 is connected to the rod block monitor 15 by a wiring 23. The rod block monitor 15 is connected to the control rod operation monitoring device 16 by a wiring 24. A control panel 18 having a display device 19 is connected to the control rod operation monitoring device 16 by a wiring 26. The control rod operation monitoring device 16 is connected to the control panel 18 even by a wiring 27. The rod drive auxiliary panel 17 is connected to the control rod operation monitoring device 16 by a wiring 28, and connected to the CRD 7 by a wiring 29.

The wiring 21, which is separately connected to the wiring 20 connected to each LPRM 6 one by one, is connected to the rod insertion monitor 11. In addition, a wiring 31 connected to the rod insertion monitor 11 is connected to the control rod operation monitoring device 16.

A configuration of the rod insertion monitor 11 will be described with reference to FIG. 2. The rod insertion monitor 11 includes a local range rod insertion monitor (first rod insertion monitor) 11A, a wide range rod insertion monitor (second rod insertion monitor) 11B, and an OR circuit 50.

The local range rod insertion monitor 11A includes a plurality of neutron flux ratio calculation units 51, a plurality of rod insertion blocks 14A, and an OR circuit 49, in which each neutron flux ratio calculation unit 51 includes four neutron flux average devices 12A and one neutron flux ratio calculation device 13A.

The relationship between the number of neutron flux ratio calculation units 51 and the number of insertion selection control rods will be described below.

In the operation of the reactor in one operation cycle, a plurality of control rod patterns are replaced as described below. In the replacement of these control rod patterns, patterns on the cross section of the core of the control rod 4, which is inserted into the core during the operation of the reactor and used to control the power of the reactor, are being changed before and after these control rod patterns are replaced. The insertion of the insertion selection control rod 4 into the core is performed when the control rod patterns are replaced. At this time, the plurality of insertion selection control rods 4 are simultaneously inserted into the core.

In the local range rod insertion monitor 11A, it is preferable that neutron flux ratio calculation units 51 are provided for each of the plurality of insertion selection control rods 4 simultaneously inserted. By doing so, it is possible to determine in real time whether the power of the fuel assemblies adjacent to each of the plurality of insertion selection control rods 4 simultaneously inserted exceeds the set output.

However, the number of insertion selection control rods 4 to be simultaneously inserted in the replacement of the control rod patterns in one operation cycle is of course different between the plurality of control rod patterns replaced in the operation cycle, and is different even in the replacement of one control rod pattern. In the one control rod pattern replacement, it is also possible to divide the number of insertion selection control rods 4 to be inserted into a plurality of different groups, and simultaneously insert the plurality of insertion selection control rods 4 for each group. For this reason, in the replacement of the plurality of control rod patterns in one operation cycle, the number of neutron flux ratio calculation units 51 is determined based on the maximum number among the insertion selection control rods 4 simultaneously inserted. The number of neutron flux ratio calculation units 51 is the same as the maximum number of insertion selection control rods 4 simultaneously inserted in the replacement of the control rod patterns.

A plurality of neutron flux average devices 12A included in the respective neutron flux ratio calculation units 51 are provided in the LPRMs 6 located at the positions A of each of the four LPRM assemblies 5, the LPRMs 6 located at the positions B of each of the four LPRM assemblies 5, the LPRMs 6 arranged at the positions C of each of the four LPRM assemblies 5, and the LPRMs 6 located at the positions D of each of the four LPRM assemblies 5, which are arranged adjacent to the insertion selection control rod 4 inserted into the core and around the insertion selection control rod 4. The neutron flux average device 12A provided corresponding to the LPRM 6 located at the position A is a neutron flux average device 12Aa. The neutron flux average device 12A provided corresponding to the LPRM 6 located at the position B is a neutron flux average device 12Ab. The neutron flux average device 12A provided corresponding to the LPRM 6 located at the position C is a neutron flux average device 12Ac. The neutron flux average device 12A provided corresponding to the LPRM 6 located at the position D is a neutron flux average device 12Ad.

For example, it is assumed that the maximum number of insertion selection control rods 4 simultaneously inserted in the replacement of the plurality of control rod patterns in one operation cycle is eight. In this case, the local range rod insertion monitor 11A has eight neutron flux ratio calculation units 51 and eight rod insertion blocks 14A.

The concept of the connection state between the LPRMs 6 included in each of the four LPRM assemblies 5 which are arranged adjacent to the selection insertion control rod 4 and around the insertion selection control rod 4 and the neutron flux average devices 12Aa, 12Ab, 12Ac, and 12Ad included in the neutron flux ratio calculation unit 51 will be described below.

Alternatively, the four LPRM assemblies 5 which are arranged adjacent to one insertion selection control rod 4 and around the insertion selection control rod 4 are LPRM assemblies 5A, 5B, 5C, and 5D shown in FIG. 2. The LPRMs 6 located at the positions A included in the respective LPRM assemblies 5A, 5B, 5C, and 5D are connected to the neutron flux average device 12Aa included in one neutron flux ratio calculation unit 51 by a separate wiring 21. The LPRMs 6 located at the positions B included in the respective LPRM assemblies 5A, 5B, 5C, and 5D are connected to the neutron flux average device 12Ab included in one neutron flux ratio calculation unit 51 by a separate wiring 21. The LPRMs 6 located at the positions C included in the respective LPRM assemblies 5A, 5B, 5C, and 5D are connected to the neutron flux average device 12Ac included in one neutron flux ratio calculation unit 51 by a separate wiring 21. The LPRMs 6 located at the positions D included in the respective LPRM assemblies 5A, 5B, 5C, and 5D are connected to the neutron flux average device 12Ad included in one neutron flux ratio calculation unit 51 by a separate wiring 21.

In one neutron flux ratio calculation unit 51, the neutron flux average devices 12Aa, 12Ab, 12Ac and 12Ad are connected to one neutron flux ratio calculation device 13A.

Even in each of the remaining seven neutron flux ratio calculation units 51 provided in the local range rod insertion monitor 11A corresponding to any one of the insertion selection control rods 4 described above and each of the remaining seven insertion selection control rods 4 simultaneously inserted into the core, similar to one neutron flux ratio calculation unit 51 described above, the neutron flux average devices 12Aa, 12Ab, 12Ac and 12Ad are connected respectively to the LPRMs 6 located at the positions A, the LPRMs 6 located at the positions B, the LPRMs 6 located at the positions C, and the LPRMs 6 located at the positions D of the four LPRM assemblies 5, which are arranged adjacent to the corresponding one insertion selection control rod 4 among seven insertion selection control rods 4 and around the insertion selection control rod 4, and are also connected to one neutron flux ratio calculation device 13A.

As described above, the concept of the connection state of the LPRMs 6 included in each of the four LPRM assemblies 5 which are arranged adjacent to the selection insertion control rod 4 and around the insertion selection control rod 4 and the neutron flux average devices 12Aa, 12Ab, 12Ac, and 12Ad included in the neutron flux ratio calculation unit 51 shows the connection state of eight insertion selection control rods when the eight insertion selection control rods 4 are simultaneously selected in the replacement of the control rod patterns. In the replacement of the plurality of control rod patterns performed in one operation cycle, the same insertion selection control rod 4 is not operated at all times, and the control rods located at different positions on the cross section of the core are also operated as the insertion selection control rod 4, and the number of insertion selection control rods 4 simultaneously inserted into the core is also different in a range of the maximum number (for example, eight) or less. By considering the above circumstances, to secure the degree of freedom of the connection state of the LPRMs 6 included in each of the four LPRM assemblies 5 which are arranged adjacent to each of the selected selection insertion control rods 4 and around the insertion selection control rod 4 and the neutron flux average devices 12Aa, 12Ab, 12Ac, and 12Ad included in the neutron flux ratio calculation unit 51, the rod insertion monitor 11 has a predetermined number of LPRM signal selectors. The connection state between the respective LPRMs 6 of the LPRM assembly 5 and the neutron flux average devices 12Aa, 12Ab, 12Ac, and 12Ad of the neutron flux ratio calculation unit 51 by using these LPRM signal selectors will be described below.

The neutron flux average device 12Aa included in each of the eight neutron flux ratio calculation units 51 is connected to the LPRMs 6 located at positions A of each LPRM assembly 5, which is arranged adjacent to and around each of all the insertion selection control rods 4 inserted in the replacement of the plurality of control rod patterns, by the wiring 21 via separate LPRM signal selectors (not shown) of the rod insertion monitor 11 for each neutron flux ratio calculation unit 51. The neutron flux average device 12Ab included in each of the eight neutron flux ratio calculation units 51 is connected to the LPRMs 6 located at the positions B of the respective LPRM assemblies 5, which are arranged adjacent to and around each of all the insertion selection control rods 4, by the wiring 21 via separate other LPRM signal selectors of the rod insertion monitor 11 for each neutron flux ratio calculation unit 51. The neutron flux average device 12Ac included in each of the eight neutron flux ratio calculation units 51 is connected to the LPRMs 6 located at the positions C of the respective LPRM assemblies 5, which are arranged adjacent to and around each of all the insertion selection control rods 4, by the wiring 21 via separate other LPRM signal selectors of the rod insertion monitor 11 for each neutron flux ratio calculation unit 51. The neutron flux average device 12Ad included in each of the eight neutron flux ratio calculation units 51 is connected to the LPRMs 6 located at the positions D of the respective LPRM assemblies 5, which are arranged adjacent to and around each of all the insertion selection control rods 4, by the wiring 21 via separate other LPRM signal selectors of the rod insertion monitor 11 for each neutron flux ratio calculation unit 51.

The neutron flux ratio calculation device 13A of each of the eight neutron flux ratio calculation units 51 is connected to a separate rod insertion block 14A. Each rod insertion block 14A is connected to the OR circuit 49.

The wide range rod insertion monitor 11B includes a plurality of neutron flux average devices 12B, a neutron flux ratio calculation device 13B, and a rod insertion block 14B. The neutron flux average device 12B is provided in the respective LPRMs 6 at the positions A, the LPRMs 6 at the positions B, the LPRMs 6 at the positions C, and the LPRMs 6 at the positions D, which are included in all the LPRM assemblies 5 arranged in the core.

Specifically, the LPRMs 6 located at the positions A which are included in the respective LPRM assemblies 5A, 5B, 5C, 5D, . . . , 5n as all (n number) of the LPRM assemblies 5 shown in FIG. 2 are connected to a neutron flux average device 12Ba by a separate wiring 21. The LPRMs 6 located at the positions B which are included in the respective LPRM assemblies 5 are connected to a neutron flux average device 12Bb by a separate wiring 21. The LPRMs 6 located at the positions C which are included in the respective LPRM assemblies 5 are connected to a neutron flux average device 12Bc by a separate wiring 21. In addition, the LPRMs 6 located at the positions D which are included in the respective LPRM assemblies 5 are connected to a neutron flux average device 12Bd by a separate wiring 21. In addition, the neutron flux average devices 12Ba, 12Bb, 12Bc, and 12Bd are connected to the neutron flux ratio calculation device 13B, and the neutron flux ratio calculation device 13B is connected to the rod insertion block 14B.

The OR circuit 49 of the local range rod insertion monitor 11A and the rod insertion block 14B of the wide range rod insertion monitor 11B are connected to the OR circuit 50. The wiring 31 connected to the rod insertion monitor 11 described above is connected to the OR circuit 50 of the rod insertion monitor 11.

In the ABWR, one hydraulic control unit is provided for each of the two CRDs 7, and one hydraulic control unit is connected to the two CRDs 7. The number of hydraulic control units is ½ of the number of CRD 7 units installed in the ABWR. The hydraulic control unit includes an accumulator 41 and nitrogen bottles 42 filled with pressurized nitrogen. The nitrogen bottles 42 are connected to the accumulator 41. A scram line 44 in which the scram valve 43 as a closed valve is provided connects between the accumulator 41 and one CRD 7. Although not shown, another scram line 44 provided with another scram valve 43 is connected to the scram line 44 shown upstream of the scram valve 43, and is also connected to another CRD 7. A wiring 52 connected to the control panel 18 is connected to the respective scram valves 43 provided in the respective scram lines 44 connected to the accumulator 41.

The control rod operation monitoring method of the first embodiment performed using the control rod operation monitoring system 10 will be described below. The control rod operation monitoring method of the first embodiment includes a rod block monitoring method and a rod insertion monitoring method.

First, the rod block monitoring method will be described.

In starting the ABWR of any one operation cycle, the control rod 4 is withdrawn from the core by the operation of the CRD 7 to turn a subcritical state into a critical state. Thereafter, the control rod 4 is further withdrawn during nuclear heatup to rated temperature and pressure, and the power of the reactor is increased to the rated power. When such a control rod 4 is withdrawn, control rod withdrawal information of a control rod withdrawal sequence is sequentially displayed on the display device 19 of the control panel 18. The control rod withdrawal information on the control rod (hereafter, referred to as the withdrawal selection control rod) 4 which is a withdrawal target includes positional information and set withdrawal amount information on the core cross section of the withdrawal selection control rod 4. An operator receives the positional information and the set withdrawal amount information on the cross section of the core of the withdrawal selection control rod 4 to be subsequently withdrawn from the control panel 18, based on the control rod withdrawal information displayed on the display device 19. By inputting the information, a control rod withdrawal command for the CRD 7 that operates the corresponding withdrawal selection control rod 4 is output from the control panel 18 to the control rod operation monitoring device 16 via the wiring 26. This control rod withdrawal command includes the positional information and the set withdrawal amount information of the withdrawal selection control rod 4.

In addition, the control rod operation monitoring device 16 which receives the control rod withdrawal command outputs a control rod withdrawal request signal for the withdrawal selection control rod 4 to the rod drive auxiliary panel 17 via the wiring 28. The control rod withdrawal signal output from the rod drive auxiliary panel 17 based on the control rod withdrawal request signal drives the motor of the CRD 7 which operates the withdrawal selection control rod 4 specified by the above positional information. The CRD 7 is operated by the driving of the motor, and the withdrawal selection control rod 4 is slowly withdrawn from the core by the set withdrawal amount. The withdrawal amount of the withdrawal selection control rod 4 can be figured out based on the position of the withdrawal selection control rod 4 in the axial direction of the core which is detected by the control rod position detector (not shown) installed in the CRD 7.

In the process of increasing the power of the reactor, the output of the reactor is increased due to the withdrawal of the withdrawal selection control rod 4. In particular, the output of the four fuel assemblies 3 adjacent to the withdrawal selection control rod 4 is increased.

During the operation of the ABWR, a coolant is supplied to the core to cool the respective fuel rods included in the fuel assembly 3. A flow of the coolant supplied to the core is controlled by an internal pump (not shown) and is detected by the core flow detector 9. The core flow detector 9 that detects the coolant flow outputs a core flow signal 33 to the wiring 23. The core flow signal 33 is input to the rod block monitor 15. The coolant is heated by heat generated by nuclear fission of a nuclear fuel material included in each fuel rod in each fuel assembly 3, and a part of the coolant turns into steam. The steam is guided to a turbine (not shown) by a main steam line (not shown) connected to the reactor pressure vessel 2.

Each LPRM 6 installed in each LPRM assembly 5 which is arranged in the core detects the neutron flux generated by the nuclear fission of the nuclear fuel material included in the fuel assembly 3 after the starting of the ABWR, and outputs a detection signal (hereinafter, referred to as an LPRM signal) of the neutron flux. The LPRM signal (neutron detection signal) 30 output from each LPRM 6 is input to the rod block monitor 15 via the wiring 20, and is input to the APRM 47 through the wiring 20 and the wiring 22. The APRM 47 averages the LPRM signal 30 to obtain the power of the reactor.

When the withdrawal selection control rod 4 is excessively withdrawn due to an erroneous operation or the like at the control panel 18 of the operator and the increase range of power in the fuel assembly 3 which is arranged around the withdrawal selection control rod 4 and is adjacent to the withdrawal selection control rod 4 becomes large, to prevent the failure of the fuel rod within the fuel assembly 3, the rod block monitor 15 serves to block the withdrawal of the withdrawal selection control rod 4. Therefore, the rod block monitor 15 inputs the LPRM signal 30 via the wiring 20 and the core flow signal 33 via the wiring 23. In order to monitor the withdrawal of the withdrawal selection control rod 4, the rod block monitor 15 calculates the rod block monitoring power (hereinafter, referred to as an RBM value) as the power of the reactor used for the rod block monitoring by using the corresponding LPRM signal among the respective LPRM signals output from the respective LPRMs 6 existing within the LPRM assembly 5 which is arranged adjacent to and around the withdrawal selection control rod 4.

Specifically, the LPRM signal selector (not shown) of the rod block monitor 15 selects the LPRM signal 30 output from each of the total of 16 LPRMs 6 existing within the four LPRM assemblies 5 adjacent to the withdrawal selection control rod 4 when the withdrawal selection control rod 4 is located at the center of the core, and selects the LPRM signal 30 output from each of all the LPRMs 6 existing within three or two LPRM assemblies 5 adjacent to the withdrawal selection control rod 4 when the withdrawal selection control rod 4 is located around the core. The rod block monitor 15 calculates an RBM value (first RBM value) using an average value of the input core flow signal 33 and each LPRM signal 30 located at the positions A and C among the all the LPRM signals 30 which are selected by the LPRM signal selector, and also calculates an RBM value (second RBM value) using an average value of the core flow signal 33 and each LPRM signal 30 located at the positions B and D among the all the LPRM signals 30. The calculation of the first RBM value and the second RBM value is performed at each calculation period of the rod block monitor 15, and the first RBM value and the second RBM value are updated by newly calculated first RBM values and second RBM values.

When one of the first RBM values and second RBM values reaches the rod block setpoint (hereinafter, referred to as RBL value) by the withdrawal operation of the withdrawal selection control rod 4, the rod block monitor 15 outputs a rod withdrawal block signal 34 for the rod block to the control rod operation monitoring device 16 via the wiring 24. The control rod operation monitoring device 16 outputs a rod withdrawal stop request signal 36 based on the rod withdrawal block signal 34. The rod drive auxiliary panel 17 to which the rod withdrawal stop request signal 36 is input via the wiring 28 transmits a rod withdrawal stop signal 38 to the CRD 7 to which the withdrawal selection control rod 4 is connected via the wiring 29. By doing so, the rotation of the motor of the corresponding CRD 7 stops, and the withdrawal of the withdrawal selection control rod 4 from the core is blocked. When the reactor starts, it is not allowed to select a control rod different from the control rod withdrawal sequence. Therefore, when the withdrawal selection control rod is blocked from being withdrawn at the time of starting the reactor, the withdrawal selection control rod is inserted into the core and returns to the position before the withdrawal, and the withdrawal operation of the withdrawal selection control rod, based on the control rod withdrawal sequence is performed.

In one of the above-mentioned operating cycles, the operator sequentially inputs the positional information and the set withdrawal amount information on the cross section of the core of the withdrawal selection control rod 4 from the control panel 18 for each withdrawal selection control rod 4, based on the control rod withdrawal information of the control rod withdrawal sequence displayed on display device 19 of the control panel 18. By the operation, the control rods 4 are sequentially withdrawn from the core, and the power of the reactor reaches the rated power. Then, the ABWR is operated at the rated power. In the ABWR, the control rod 4 inserted into the core is slowly withdrawn from the core by using the CRD 7 to maintain the power of the reactor at the rated power.

Next, the rod insertion monitoring method of the control rod operation monitoring method of the first embodiment will be described.

In order to effectively use the nuclear fuel material included in all the fuel assemblies loaded in the core, that is, to burn the nuclear fuel material included in all the fuel assemblies as uniformly as possible during an operation period of the reactor in one operation cycle of the reactor, the plurality of control rod patterns are replaced in one operation cycle. The replacement of the control rod patterns is an operation of changing the position and the degree of insertion of the respective control rods inserted into the core on the cross section of the core. In the first embodiment, the replacement of the control rod patterns is performed twice, for example.

The replacement of the control rod patterns is performed by reducing the flow of coolant supplied to the core (or inserting the control rod 4 into the core) to reduce the power of the reactor from the rated power, for example, to 80% power, inserting the plurality of control rods 4 located at a position on the cross section of the core which is different from the control rods 4 inserted until now, and making the plurality of control rods inserted into the core into the completely withdrawn state until before the replacement of the control rod patterns is performed. The insertion of the control rods is performed, for example, by simultaneously inserting the plurality of control rods (insertion selection control rods) 4, and a predetermined new control rod pattern is formed by the plurality of insertion selection control rods 4 inserted into the core. After the control rod pattern is formed, for example, the flow of coolant supplied to the core is increased to increase the power of the reactor to the rated power, and the operation of the reactor whose power is maintained at the rated power is continued.

When the plurality of insertion selection control rods 4 are simultaneously inserted, it is likely to cause the insertion block of the insertion selection control rod 4 due to the increased fluctuation of the LPRM signal during the replacement of the control rod patterns.

It is assumed to reach the time when the first control rod pattern is replaced during the operation of the reactor in the above-mentioned one operation cycle. The control rod pattern is already displayed on the display device 19 of the control panel 18 before the control rod pattern is replaced. Then, the control rod pattern after the replacement of the control rod patterns is newly displayed on the display device 19 of the control panel 18. The control rods 4 included in the former control rod pattern is the withdrawal selection control rods 4 which is completely withdrawn from the core during the current replacement of the control rod patterns, and each control rod 4 included in the latter control rod pattern is the insertion selection control rod 4 newly inserted into the core in the current replacement of the control rod patterns.

As described above, the power of the reactor is reduced from the rated power to 80% power. The plurality of control rods 4 inserted into the core in the replacement of the first control rod patterns are divided into the plurality of groups, and the plurality of insertion selection control rods 4 for each group are simultaneously inserted into the core in a predetermined order. According to the insertion sequence of the insertion selection control rod, the control rod insertion information including the positional information and the set insertion amount on the cross section of the core of the insertion selection control rod 4 is displayed on the display device 19 of the control panel 18.

A group of any insertion selection control rods in the replacement of the first control rod pattern includes the eight insertion selection control rods 4 (the maximum number of insertion selection control rods simultaneously inserted in the replacement of all the control rod patterns in the first embodiment). The case in which the eight insertion selection control rods 4 of the group are simultaneously inserted into the core will be described. The control rod insertion information relating to the eight insertion selection control rods 4 is displayed on the display device 19 of the control panel 18. The operator receives the positional information and the set insertion amount information on the core cross section of each insertion selection control rod 4 from the control panel 18, based on the control rod insertion information of the displayed eight insertion selection control rods 4. Thereafter, the control rod insertion command for each CRD 7 connected to each of the eight insertion selection control rods 4 is output from the control panel 18 to the control rod operation monitoring device 16 via the wiring 26. The control rod insertion command includes command to insert the positional information and the set insertion amount information of the insertion selection control rod 4.

The control rod insertion command on the insertion selection control rod 4 is also output from the control panel 18 to a control device (not shown) which controls the LPRM signal selector of the local range rod insertion monitor 11A. This control device operates the corresponding LPRM signal selector based on the input control rod insertion command so that the LPRM signal of the corresponding LPRM 6 is input to the corresponding neutron flux average device 12A of the single neutron flux ratio calculation unit 51.

For example, as described above, when the eight insertion selection control rods 4 are selected, the neutron flux average devices 12Aa, 12Ab, 12Ac, and 12Ad included in each of the eight neutron flux ratio calculation units 51 are connected respectively to the LPRMs 6 located at the positions A, the LPRMs 6 located at the positions B, the LPRMs 6 located at the positions C, and the LPRMs 6 located at the positions D of each LPRM assembly 5 which is arranged adjacent to and around the insertion selection control rod 4 by the corresponding LPRM signal selector operated by the control device.

In addition, the control rod operation monitoring device 16 which receives the control rod insertion command outputs the control rod insertion request signal for the insertion selection control rod 4 to the rod drive auxiliary panel 17 via the wiring 28. The control rod insertion signal output from the rod drive auxiliary panel 17 based on the control rod insertion request signal drives the motor of the CRD 7 which operates the insertion selection control rod 4 specified by the above positional information. The motor rotates in a direction opposite to that when the control rod 4 is withdrawn. By doing so, the insertion selection control rod 4 is inserted into the core until the set insertion amount is reached. The insertion amount of the insertion selection control rod 4 can be figured out based on the position of the insertion selection control rod 4 in the axial direction the core detected by the control rod position detector described above.

When the eight insertion selection control rods 4 are simultaneously inserted into the core in the replacement of the first control rod pattern, each LPRM 6 located at the positions A of each LPRM assembly 5 adjacent to the eight insertion selection control rods 4 detects the neutron flux and outputs the LPRM signals. These LPRM signals are separately input to the neutron flux average device 12Aa of the neutron flux ratio calculation unit 51 corresponding to each of the eight insertion selection control rods 4 via the corresponding LPRM signal selector operated for each of the four LPRM assemblies 5 corresponding to each of the eight insertion selection control rods 4 inserted. Each neutron flux average device 12Aa of the eight neutron flux ratio calculation units 51 averages the LPRM signals from the four LPRMs 6 located at the position A and generates an average LPRM signal corresponding to the position A.

Each LPRM 6 located at the positions B of each LPRM assembly 5 adjacent to the eight insertion selection control rods 4 detects the neutron flux and outputs the LPRM signals. These LPRM signals are separately input to the neutron flux average device 12Ab of the neutron flux ratio calculation unit 51 corresponding to each of the eight insertion selection control rods 4 via the corresponding LPRM signal selector operated for each of the four LPRM assemblies 5 corresponding to each of the eight insertion selection control rods 4 inserted. Each neutron flux average device 12Ab of the eight neutron flux ratio calculation units 51 averages the LPRM signals from the four LPRMs 6 located at the position B and generates the average LPRM signal for the position B.

Each LPRM 6 located at the positions C of each LPRM assembly 5 adjacent to the eight insertion selection control rods 4 detects the neutron flux and outputs the LPRM signals. These LPRM signals are separately input to the neutron flux average device 12Ac of the neutron flux ratio calculation unit 51 corresponding to each of the eight insertion selection control rods 4 via the corresponding LPRM signal selector operated for each of the four LPRM assemblies 5 corresponding to each of the eight insertion selection control rods 4 inserted. Each neutron flux average device 12Ac of the eight neutron flux ratio calculation units 51 averages the LPRM signals from the four LPRMs 6 located at the position C and generates the average LPRM signal for the position C.

Each LPRM 6 located at the positions D of each LPRM assembly 5 adjacent to the eight insertion selection control rods 4 detects the neutron flux and outputs the LPRM signals. These LPRM signals are separately input to the neutron flux average device 12Ad of the neutron flux ratio calculation unit 51 corresponding to each of the eight insertion selection control rods 4 via the corresponding LPRM signal selector operated for each of the four LPRM assemblies 5 corresponding to each of the eight insertion selection control rods 4 inserted. Each neutron flux average device 12Ad of the eight neutron flux ratio calculation units 51 averages the LPRM signals from the four LPRMs 6 located at the position D and generates the average LPRM signal for the position D.

In each of the eight neutron flux ratio calculation units 51, the average LPRM signal (average neutron flux) at the position A generated by the neutron flux average device 12Aa, the average LPRM signal (average neutron flux) at the position B generated by the neutron flux average device 12Ab, the average LPRM signal (average neutron flux) at the position C generated by the neutron flux average device 12Ac, and the average LPRM signal (average neutron flux) at the position D generated by the neutron flux average device 12Ad are input to the neutron flux ratio calculation device 13A which is connected to the neutron flux average devices 12Aa, 12Ab, 12Ac, and 12Ad. The neutron flux ratio calculation device 13A of each of the eight neutron flux ratio calculation units 51 calculates the ratio (neutron flux ratio $B_A/A_A$) of the average LPRM signal at the position B, the ratio (neutron flux ratio $C_A/A_A$) of the average LPRM signal at the position C, and the ratio (neutron flux ratio $D_A/A_A$) of the average LPRM signal at the position D generated by the neutron flux average device 12Ad with respect to the average LPRM signal at the position A, respectively.

The respective rod insertion blocks 14A which are separately connected to each neutron flux ratio calculation device 13A of the eight neutron flux ratio calculation units 51 receive the neutron flux ratios $B_A/A_A$, $C_A/A_A$, and $D_A/A_A$ from the corresponding neutron flux ratio calculation device 13A and determines whether the maximum neutron flux ratio out of these neutron flux ratios exceeds the set neutron flux ratio. The respective rod insertion blocks 14A output a signal "1" which is the rod insertion block signal 48 which blocks the insertion of the insertion selection control rod 4 when the maximum neutron flux ratio exceeds the set neutron flux ratio, and output a signal "0" which is a non-rod insertion block signal which does not block the insertion of the insertion selection control rod 4 when the maximum neutron ratio does not exceed the set neutron flux ratio.

In the first embodiment, since each rod insertion block 14A determines that the maximum neutron flux ratio does not exceed the set neutron flux ratio, all the rod insertion blocks 14A output a signal "0". The signal "0" output from all the rod insertion blocks 14A is input to the OR circuit 49. Since all the input signals are "0", the OR circuit 49 outputs the signal "0" which is the non-rod insertion block signal.

On the other hand, the neutron flux average device 12Ba of the wide range rod insertion monitor 11B receives the LPRM signals output from each LPRM 6 located at each position A of all the LPRM assemblies 5 arranged in the core. The neutron flux average device 12Ba generates the average LPRM signal (average neutron flux) of the LPRM signals. The neutron flux average device 12Bb of the wide range rod insertion monitor 11B receives the LPRM signals output from each LPRM 6 located at each position B of all of the LPRM assemblies 5. The neutron flux average device 12Bb generates the average LPRM signal (average neutron flux) of the LPRM signals. The neutron flux average device 12Bc of the wide range rod insertion monitor 11B receives the LPRM signals output from each LPRM 6 located at each position C of all of the LPRM assemblies 5. The neutron flux average device 12Bc generates the average LPRM signal (average neutron flux) of the LPRM signals. In addition, the neutron flux average device 12Bd of the wide range rod insertion monitor 11B receives the LPRM signals output from each LPRM 6 located at each position D of all of the LPRM assemblies 5. The neutron flux average device 12Bd generates the average LPRM signal (average neutron flux) of the LPRM signals.

The average LPRM signals generated by the respective neutron flux average devices 12Ba, 12Bb, 12Bc, and 12Bd are input to the neutron flux ratio calculation device 13B. Similarly to the neutron flux ratio calculation device 13A, the neutron flux ratio calculation device 13B uses the input average LPRM signals to calculate the ratio (neutron flux ratio $B_B/A_B$) of the average LPRM signal at the position B, the ratio (neutron flux ratio $C_B/A_B$) of the average LPRM signal at the position C, and the ratio (neutron flux ratio $D_B/A_B$) of the average LPRM signal at the position D generated by the neutron flux average device 12Ad with respect to the average LPRM signal at the position A. The rod insertion block 14B connected to the neutron flux ratio calculation device 13B receives the neutron flux ratios $B_B/A_B$, $C_B/A_B$, and $D_B/A_B$ input from the neutron flux ratio calculation device 13B, and determines whether the maximum neutron flux ratio out of these neutron flux ratios exceeds the set neutron flux ratio. The rod insertion block 14B outputs the generated signal "1" which is the rod insertion block signal 48 when the maximum neutron flux ratio exceeds the set neutron flux ratio, and outputs the generated signal "0" which is the non-rod insertion block signal when the maximum neutron flux ratio does not exceed the set neutron flux ratio. In the first embodiment, since the maximum neutron flux ratio does not exceed the neutron flux ratio, the rod insertion block 14B outputs the signal "0" which is the non-rod insertion block signal.

The signal "0" (non-rod insertion signal) output from the rod insertion block 14B and the signal "0" (non-rod insertion block signal) output from the OR circuit 49 are input to the OR circuit 50. At this time, the OR circuit 50, that is, the rod insertion monitor 11 outputs the signal "0", that is, the non-rod insertion block signal.

Since the control rod operation monitoring device 16 that has received the non-rod insertion block signal from the rod insertion monitor 11 does not output the rod insertion stop request signal 37, the insertion of the eight insertion selection control rods 4 into the core is continued. When the insertion amount of these insertion selection control rods 4 into the core reaches the set insertion amount, the insertion of the eight insertion selection control rods 4 into the core stops.

Thereafter, in the replacement of the first control rod pattern, a plurality of insertion selection control rods 4 of another group are simultaneously inserted into the core. The number of insertion selection control rods of the group is smaller than eight, and is four, for example. Based on the control rod insertion information of the displayed four insertion selection control rods 4, the operator receives the positional information and the set insertion amount information on the core cross section of each insertion selection control rod 4 from the control panel 18. Thereafter, the control rod insertion command for each CRD 7 connected to each of the four insertion selection control rods 4 is output from the control panel 18 to the control rod operation monitoring device 16 via the wiring 26. As a result, the four insertion selection control rods 4 are inserted into the core by the operation of their CRDs 7.

For each of the four LPRM assemblies 5 which are arranged adjacent to and around each of the four insertion selection control rods 4, each LPRM 6 located at the position A, each LPRM 6 located at the position B, each LPRM 6 located at the position C and each LPRM 6 located at the position D need to be connected to the neutron flux average devices 12Aa, 12Ab, 12Ac, and 12Ad included in each of the four neutron flux ratio calculation unit of the local range rod insertion monitor 11A. The above-mentioned control device receiving the control rod insertion command operates each of the corresponding LPRM signal selector of the local range rod insertion monitor 11A, such that each LPRM 6 located at the positions A, each LPRM 6 located at the positions B, each LPRM 6 located at the positions C, and each LPRM 6 located at the positions D of the above-mentioned four LPRM assemblies 5 corresponding to each of the four insertion selection control rods 4 are connected to the neutron flux average devices 12Aa, 12Ab, 12Ac, and 12Ad included in each of the four neutron flux ratio calculation units 51 of the eight neutron flux ratio calculation units 51 included in the local range rod insertion monitor 11A. Therefore, the LPRM signals from each LPRM 6 located at the positions A, the LPRM signals from each LPRM 6 located at the positions B, the LPRM signals from each LPRM 6 located at the positions C, and the LPRM signals from each LPRM 6 located at the positions D of the above-mentioned four LPRM assemblies 5 are input to the neutron flux average devices 12Aa, 12Ab, 12Ac, and 12Ad included in each of the four neutron flux ratio calculation units 51 of the local range rod insertion monitor 11A.

As described above, the neutron flux average devices 12Aa, 12Ab, 12Ac, and 12Ad included in each of the four neutron flux ratio calculation units 51 generate the average LPRM signal at the position A, the average LPRM signal at the position B, the average LPRM at the position C signal, and the average LPRM signal at the position D. In addition, as described above, the neutron flux ratio calculation device 13A of each of the four neutron flux ratio calculation units 51 calculates the neutron flux ratio $B_A/A_A$, the neutron flux ratio $C_A/A_A$ and the neutron flux ratio $D_A/A_A$, respectively. As described above, four rod insertion blocks 14A connected to each of the neutron flux ratio calculation devices 13A of the four neutron flux ratio calculation units 51 determine whether the maximum neutron flux ratio of the neutron flux ratios $B_A/A_A$, $C_A/A_A$, and $D_A/A_A$ exceeds the set neutron flux ratio. In the first embodiment, each of the rod insertion blocks 14A outputs the generated signal "0" which is the non-rod insertion block signal since the maximum neutron flux ratio does not exceed the set neutron flux ratio. As a result, the OR circuit 49 also outputs the signal "0".

Further, the rod insertion block 14B of the wide range rod insertion monitor 11B outputs a signal "0". The OR circuit 50 to which each power of the OR circuit 49 and the rod insertion block 14B are input, that is, the rod insertion monitor 11 outputs a non-rod insertion block signal (signal "0"). As a result, the insertion of the four insertion selection control rods 4 into the core is continued until the insertion amount of these insertion selection control rods 4 into the core reach the set insertion amount.

In the case where the insertion selection control rod 4 which is not yet inserted into the core still remains in the replacement of the first control rod pattern after the insertion of the four insertion selection control rods 4 into the core ends, the operator receives the positional information and the set insertion amount information on the cross section of the core of the insertion selection control rod 4 from the control panel 18, such that the remaining insertion selection control rod 4 is inserted into the core, based on the control rod insertion information depending on the insertion sequence of the insertion selection control rod 4.

After all the insertion selection control rods 4 in the replacement of the first control rod pattern are inserted into the core, the plurality of control rods inserted into the core are completely withdrawn until before the control rod pattern is replaced. As described above, the withdrawal of these withdrawal selection control rods 4 is performed by allowing the operator to input the positional information and the set withdrawal amount information on the cross section of the core of the withdrawal selection control rod 4 based on the control rod withdrawal information of the control rod withdrawal sequence displayed on the display device 19 of the control panel 18. The respective withdrawal selection control rods 4 selected are sequentially withdrawn from the core until the withdrawal selection control rods 4 are in the completely withdrawn state. The LPRM signals output from each LPRM 6 of the four LPRM assemblies 5 which are arranged adjacent to the withdrawal selection control rod 4 and around the withdrawal selection control rod 4 are input to the rod block monitor 15. The rod block monitor 15 calculates the first RBM value and the second RBM value, and outputs the rod withdrawal block signal 34 when anyone of the first RBM value and the second RBM reaches the RBL value. However, in the withdrawal operation of all the withdrawal selection control rods 4 in the replacement of the first control rod pattern, neither of the first RBM value nor the second RBM value reached the RBL value.

When the withdrawal operation of all the withdrawal selection control rods 4 is completed, the replacement of first control rod pattern ends. The flow of the coolant supplied to the core is increased, and the power of the reactor is increased to the rated power. The reactor continues to be operated at the rated power, and eventually the replacement of the second control rod pattern is performed. Even in the replacement of the second control rod pattern, the targeted insertion selection control rod 4 and the withdrawal selection control rod 4 are different, but the insertion operation of the plurality of insertion selection control rods 4 into the core and the withdrawal operations of the plurality of withdrawal selection control rods 4 from the core are performed. After the replacement of the second control rod pattern is completed, the reactor is operated at the rated power. Eventually, the operation of the reactor stops, and on operation cycle ends.

Here, a description will be made assuming that the insertion block of the insertion selection control rod 4 occurs in the rod insertion monitoring method. At the time of the insertion operation of these insertion selection control rods 4 in which the eight insertion selection control rods 4 are slowly inserted into the core by the motor-driven CRD 7 in the first replacement of the control rod pattern, when at least one rod insertion block 14A of the eight rod insertion blocks 14A separately connected to each of the eight neutron flux ratio calculation units 51 of the local range rod insertion monitor 11A determines that the maximum neutron flux ratio out of the input neutron flux ratios $B_A/A_A$, $C_A/A_A$, and $D_A/A_A$ exceeds the set neutron flux ratio, the at least one rod insertion block 14A outputs the generated signal "1" which is the rod insertion block signal 48. Therefore, the OR circuit 49 also outputs "1". When the rod insertion block 14B of the wide range rod insertion monitor 11B outputs the signal "0" which is the non-rod insertion block signal, the OR circuit 50 which receives the output signals of the OR circuit 49 and the rod insertion block 14B, respectively, outputs the rod insertion block signal 48 which is the signal "1".

This rod insertion block signal 48 is input to the control rod operation monitoring device 16. The control rod operation monitoring device 16 outputs the rod insertion stop request signal 37 based on the input rod insertion block signal 48. The rod drive auxiliary panel 17 receiving the rod insertion stop request signal 37 via the wiring 28 transmits the rod insertion stop signal 39 to each CRD 7, to which the eight insertion selection control rods 4 simultaneously inserted are connected, via the wiring 29. By doing so, the rotation of the motor of these CRDs 7 stops, and the insertion of the eight insertion selection control rods 4, which are simultaneously inserted, into the core is blocked.

When each of the eight insertion selection control rods 4 simultaneously inserted is slowly inserted into the core by the motor drive in the CRD 7 at the time of the insertion into the core, the power of the reactor is finally decreased, but there is a possibility that the power distribution in the axial direction of the core is abnormally distorted and the failure of the fuel rod occurs with some causes during the insertion of the insertion selection control rods 4 into the core. As described above, the first embodiment, which blocks the insertion of the insertion selection control rod, can block the failure of the fuel rod due to the abnormal distortion of the power distribution in the axial direction of the core.

The control rod operation monitoring device 16 outputs the input rod insertion block signal 48 to the control panel 18 via the wiring 27. Since the rod insertion block signal 48 input to the control panel 18 is displayed on the display device 19, the operator who sees the display device 19 can know that the insertion selection control rod 4 is blocked from being inserted into the core.

The reactor is scrammed when the insertion selection control rod 4 is blocked from being inserted into the core. The operator who knows that the insertion selection control rod 4 is blocked from being inserted into the core by viewing the display device 19 rotates a scram lever (not shown) provided on the control panel 18 up to an ON position. The scram signal generated by the rotation of the lever is transmitted to the scram valves 43 which are provided on the respective scram lines 44 connected to the two CRDs 7 via the wiring 52 to open these scram valves 43. The high-pressure driving water in the accumulator 41 which is pressurized by the pressurized air in the nitrogen bottles 42 is supplied to the respective CRDs 7 through the two scram lines 44. For this reason, the two CRDs 7 are driven by the high-pressure driving water, and each control rod 4 connected to these CRDs 7 is quickly inserted into the core. As a result, the operation of the reactor stops. Thereafter, the cause of the insertion block of the insertion selection control rod 4 into the core is investigated.

Here, the case in which these insertion selection control rods 4 are blocked from being inserted when the eight insertion selection control rods 4 are simultaneously inserted into the core was described. However, in the case in which the insertion block of the eight insertion selection control rods 4 simultaneously inserted does not occur, but a plurality of other insertion selection control rods 4 are simultaneously inserted, the plurality of other insertion selection control rods 4 are blocked from being inserted into the core even when the OR circuit 49 outputs the signal "1", and the rod insertion block 14B outputs the signal "0".

In the case in which the insertion selection control rod is erroneously inserted, as described in JP 2012-163438 A, the insertion of the selected insertion selection control rod is blocked when the positional information of the input insertion selection control rod 4 is different from the positional information of the insertion selection control rod in the insertion sequence of the insertion selection control rod when the insertion selection control rod 4 is selected (when the position of the insertion selection control rod 4 is input). In the first embodiment, examples of the causes "some causes" which generate the rod insertion block signal which blocks the insertion selection control rod 4 from being inserted into the core by the local range rod insertion monitor 11A and the rod insertion block signal which blocks the insertion of all the control rods 4 including the insertion selection control rod 4 into the core by the wide range rod insertion monitor 11B may include the failure of the system which blocks the insertion of the insertion selection control rod based on the above selection error of the insertion selection control rod, the output of the erroneous signal of the system which controls the operation of the insertion selection control rod, and the like.

In addition, when the above-mentioned eight insertion selection control rods 4 simultaneously inserted are selected, the case in which all the control rods including these insertion selection control rods 4 are slowly inserted into the core by the motor-driven CRD 7 with some causes will be described. At this time, the LPRM signals from all the LPRMs 6 located at the positions A of each LPRM assembly 5 which is arranged adjacent to the respective insertion selection control rods 4 and around the respective insertion selection control rods 4, that is, all the LPRM assemblies 5 arranged in the core are input to the neutron flux average device 12Ba, and the LPRM signals from all the LPRMs 6 located at the position B of all the LPRM assemblies 5 are input to the neutron flux average device 12Ba. The LPRM signals from all the LPRMs 6 located at the positions C of all the LPRM assemblies 5 are input to the neutron flux average device 12Bc, and the LPRM signals from all the LPRMs 6 located at the positions D of all the LPRM assemblies 5 are input to the neutron flux average device 12Bd. The respective neutron flux average devices 12Ba, 12Ba, 12Bc, and 12Bd generate the average LPRM signal for the position A, the average LPRM signal for the position B, the average LPRM signal for the position C, and the average LPRM signal for the position D. These average LPRM signals are input to the neutron flux ratio calculation device 13B. The neutron flux ratio calculation device 13B calculates neutron flux ratio $B_B/A_B$, neutron flux ratio $C_B/A_B$, and neutron flux ratio $D_B/A_B$, respectively, based on the respective input average LPRM signals.

The rod insertion block 14B which inputs these neutron flux ratios determines whether the maximum neutron flux ratio out of these neutron flux ratios exceeds the set neutron flux ratio. For example, when the maximum neutron flux ratio exceeds the set neutron flux ratio since the LPRM signals are fluctuated, the rod insertion block 14B outputs the generated signal "1" which is the rod insertion block signal 48. Therefore, the OR circuit 50 of the rod insertion monitor 11 outputs the rod insertion block signal (signal "1") 48 regardless of whether the power of the OR circuit 49 of the local range rod insertion monitor 11A is the signal "1" or the signal "0". Therefore, all the control rods inserted into the core are blocked from being inserted into the core.

In the first embodiment, the ratio of the average of the LPRM signals from other four LPRMs (second LPRM) located at the same position in the axial direction of the core on the other end (upper end of the core) of the core which is an opposite side to the insertion end of the control rod of the core rather than the first LPRM 6 of the four LPRM assemblies 5 with respect to the average of the LPRM signals from each of the four LPRMs (the first LPRM) 6 located at the position (position A) closest to the control rod insertion end (lower end of the core) of the core in the axial direction of the core of the four LPRM assemblies 5 which have the LPRMs 6 located at each of the plurality of different positions (position A, position B, position C, and position D) in the axial direction of the core and arranged around the insertion selection control rod 4 within the core, that is, the neutron flux ratio is calculated. In the first embodiment, the neutron flux ratios $B_A/A_A$, $C_A/A_A$, and $D_A/A_A$ are obtained. When the maximum neutron flux ratio out of these neutron flux ratios exceeds the set neutron flux ratio, the rod insertion block signal 48 is output from the rod insertion monitor 11. In the first embodiment, since the rod insertion monitor 11 determines whether to output the rod insertion block signal 48 based on the neutron flux ratio, there is no need to perform the averaging of the power (the LPRM signal at the position A or the LPRM signal at the position B) of the lower part of the core performed at the time of the withdrawal of the withdrawal selection control rod and the power (the LPRM signal at the position C or the LPRM signal at the position D) of the upper part of the core, and in simultaneously inserting the plurality of insertion selection control rod 4, the increase in the power of the fuel assembly adjacent to the insertion selection control rod 4 can be accurately reflected on the determination as to whether to generate the rod insertion block signal 48, that is, whether to output the rod insertion block signal 48.

Further, since it is possible to make the setpoint, at which the insertion block signal is generated, large by using the neutron flux ratio, it is difficult to reach the setpoint even if there is the fluctuation in the case of the normal insertion operation and it is possible to suppress the generation of the rod insertion block signal due to the influence of the fluctuation. Therefore, the determination as to whether to output the rod insertion block signal 48 based on the neutron flux ratio can be little influenced by the fluctuation of the neutron flux, and the determination accuracy as to whether to output the rod insertion block signal 48, that is, whether to generate the rod insertion block signal 48 can be improved.

Therefore, it is possible to accurately block the insertion operation of the insertion selection control rod 4 into the core during the operation of the reactor by determining as to whether to generate the rod insertion block signal 48 based on the neutron flux ratio, and it is possible to reduce the erroneous block of the insertion operation.

By the way, for example, when the upper end of the insertion selection control rod 4 is inserted from the lower end of the core to a position slightly higher than the LPRM 6 at the position B, the power of the four fuel assemblies 3 arranged adjacent to the insertion selection control rod 4 and around the insertion selection control rod 4 is lowest at the portion adjacent to the insertion portion of the insertion selection control rod 4. For this reason, the LPRM signals output from the LPRMs 6 which are located at the position A and the position B of each of the four LPRM assemblies 5 arranged adjacent to the insertion selection control rod 4 and around the insertion selection control rod 4 are the lowest, and the LPRM signals output from the respective LPRMs 6 located at the positions A and B are substantially the same. The LPRM signals output from each LPRM 6 (each LPRM 6 located at the position C and each LPRM 6 located at the position D) which is located at the portion not adjacent to the insertion portion of the insertion selection control rod 4 of each of the four LPRM assemblies 5 become large.

In such a state, the neutron flux ratio $B_A/A_A$ calculated by the neutron flux ratio calculation device 13A of any one neutron flux ratio calculation unit 51 for inputting the LPRM signals from each LPRM 6 of the four LPRM assemblies 5 is about 1, and the neutron flux ratios $C_A/A_A$ and $D_A/A_A$ each become a large value. When the upper end of the insertion selection control rod 4 is inserted from the lower end of the core to the position slightly higher than the LPRM 6 at the position B, the maximum neutron flux ratio which becomes the target of the determination as to whether or not to exceed the set neutron flux ratio in the rod insertion block 14A becomes any of the neutron flux ratios $C_A/A_A$ and $D_A/A_A$ out of the neutron flux ratios $B_A/A_A$, $C_A/A_A$, and $D_A/A_A$.

In the first embodiment, since it is determined whether the maximum neutron flux ratio out of the input neutron flux ratios $B_A/A_A$, $C_A/A_A$, and $D_A/A_A$ exceeds the set neutron flux ratio, each rod insertion block 14A can perform the determination as to whether to generate the rod insertion block signal 48 in a shorter time as compared with the case of separately determining as to whether the respective neutron flux ratios $B_A/A_A$, $C_A/A_A$, and $D_A/A_A$ exceed the set neutron flux ratio. For this reason, when there is a need to block the insertion selection control rod 4 from being inserted, it is possible to block the insertion selection control rod 4 from being inserted accordingly.

In the wide range rod insertion monitor 11B to which the LPRM signals from all the LPRMs 6 located at the positions A, B, C, and D of all the LPRM assemblies 5 arranged in the core are input, as described above, the neutron flux ratio calculation device 13B calculates each of the neutron flux ratio $B_B/A_B$, the neutron flux ratio $C_B/A_B$, and the neutron flux ratio $D_B/A_B$, respectively, and the rod insertion block 14B determines whether the maximum neutron flux ratio out of these neutron flux ratios exceeds the set neutron flux ratio and outputs the rod insertion block signal 48 when the maximum neutron flux ratio exceeds the set neutron flux ratio. In the first embodiment in which the wide range rod insertion monitor 11B is included, when the plurality of insertion selection control rods 4 simultaneously inserted are selected, in the case in which all the control rods 4 including these insertion selection control rods 4 are inserted into the core with some causes, the wide range rod insertion monitor 11B determines whether to output the rod insertion block signal 48 based on the neutron flux ratio, and makes the set neutron flux ratio outputting the insertion block signal large, such that the determination can be little influenced by the fluctuation of the neutron flux and it is possible to improve the determination accuracy as to whether to generate the rod insertion block signal 48. For this reason, it is possible to block all the control rods 4 including the plurality of insertion selection control rods 4 from being inserted into the core by the action of the wide range rod insertion monitor 11B. Further, since the wide range rod insertion monitor 11B averages the LPRM signals of the respective positions A, B, C, and D in all the LPRM assemblies 5 and calculates the above-mentioned neutron flux ratio using the average LPRM signals of the respective positions, even when there is no positional information of the insertion selection control rods 4 which are being operated, it is possible to monitor the insertion selection control rods 4 in real time.

In the first embodiment, in the case in which the insertion selection control rod 4 is blocked from being inserted when the plurality of insertion selection control rods 4 are slowly inserted into the core simultaneously, the reactor is scrammed after the insertion block. In this scram, all the control rods 4 provided in the reactor 1 are instantaneously inserted into the core. Therefore, in the scram of the reactor, the abnormal distortion of the axial power distribution which can occur when each of the plurality of insertion selection control rods 4 is slowly inserted into the core simultaneously by the motor drive in the CRD 7 does not occur, and the failure of the fuel rods does not occur. In addition, even when all the control rods 4 including the insertion selection control rod 4 are slowly inserted into the core with some causes at the time of the insertion of the insertion selection control rod 4, similarly, all the control rods 4 are instantaneously inserted into the core, and the reactor is scrammed.

Further, in the first embodiment, the scram of the reactor is performed after the insertion selection control rod 4 is blocked from being inserted, so that the causes of the insertion block of the insertion selection control rods 4 can be investigated at an early stage and the re-starting of the reactor in which the insertion selection control rods 4 are blocked from being inserted can be performed at an early stage.

In the first embodiment, although the rod insertion block 14A is separately connected to the neutron flux ratio calculation device 13A of the respective neutron flux ratio calculation units 51, the neutron flux ratio calculation device 13A of the respective neutron flux ratio calculation units 51 is connected to one rod insertion block 14A. In this case, the local range rod insertion monitor 11A does not have the OR circuit 49, and one rod insertion block 14A is directly connected to the OR circuit 50.

One rod insertion block 14A inputs the neutron flux ratios $B_A/A_A$, $C_A/A_A$, and $D_A/A_A$ calculated by the neutron flux ratio calculation device 13A of the respective neutron flux ratio calculation units 51. The rod insertion block 14A determines whether the maximum neutron flux ratio out of the neutron flux ratios $B_A/A_A$, $C_A/A_A$, and $D_A/A_A$ input for each neutron flux ratio calculation device 13A exceeds the set neutron flux ratio based on the neutron flux ratios $B_A/A_A$, $C_A/A_A$, and $D_A/A_A$ input from the respective neutron flux ratio calculation devices 13A.

When the insertion selection control rods 4 simultaneously inserted are eight, the neutron flux ratios $B_A/A_A$, $C_A/A_A$, and $D_A/A_A$ are input to one rod insertion block 14A from the respective neutron flux ratio calculation device 13A of the eight neutron flux ratio calculation unit 51. When the maximum neutron flux ratio out of the neutron flux ratios $B_A/A_A$, $C_A/A_A$, and $D_A/A_A$ input from the neutron flux ratio calculation device 13A of one neutron flux ratio calculation unit 51 exceeds the set neutron flux ratio, the rod insertion block 14A outputs the rod insertion block signal 48. By doing so, the eight insertion selection control rods 4 are blocked from being inserted into the core.

In this way, the neutron flux ratio calculation device 13A of the respective neutron flux ratio calculation units 51 is connected to one rod insertion block 14A, so one rod insertion block 14A is required for the plurality of neutron flux ratio calculation units 51, thereby simplifying the configuration of the control rod operation monitoring system 10.

In the first embodiment, the local range rod insertion monitor 11A is provided with the same number of neutron flux ratio calculation units 51 as the maximum number of insertion selection control rods 4 to be simultaneously inserted, and furthermore, the respective neutron flux ratio calculation units 51 are provided with the four neutron flux average device 12A, that is, the neutron flux average devices 12Aa, 12Ab, 12Ac, and 12Ad and one neutron flux ratio calculation device 13A. The average LPRM signals are obtained at each position A, B, C, and D of the four LPRM assemblies 5A, 5B, 5C, and 5D arranged adjacent to and around one insertion selection control rod 4 for each neutron flux ratio calculation unit 51 having the number corresponding to the number (maximum number or less) of insertion selection control rods 4 simultaneously inserted, and the neutron flux ratios B/A, C/A, and D/A are calculated based on these average LPRM signals.

In contrast, the local range rod insertion monitor 11A may be configured to include a storage device, one neutron flux average device 12A, one neutron flux ratio calculation device 13A, and one rod insertion block 14A.

In the local range rod insertion monitor 11A configured as described above which performs the processing to be described below by the input of the LPRM signal, the LPRM signals from the LPRMs 6 located at each position A, B, C, and D of the four LPRM assemblies 5A, 5B, 5C, and 5D, which are separately arranged adjacent to each of the plurality of insertion selection control rods 4 simultaneously inserted and around each of the plurality of insertion selection control rods 4, are input, and these LPRM signals are stored in the above-mentioned storage device. One neutron flux average device 12A averages the four LPRM signals output from each LPRM 6 located at the positions A of each of the four LPRM assemblies 5A, 5B, 5C, and 5D, which are arranged adjacent to one of the plurality of insertion selection control rods 4 simultaneously inserted and around the respective insertion selection control rods 4, among the LPRM signals stored in the storage device to obtain the average LPRM signal at the position A. In addition, the one neutron flux average device 12A averages the four LPRM signals output from each LPRM 6 located at the respective positions A, B, C, and D of each of the four LPRM assemblies 5A, 5B, 5C, and 5D to obtain the average LPRMs at the positions B, C, and D. The obtained average LPRM signals at each position are stored in the storage device as described above. Further, even for each of remaining insertion selection control rods 4 among the plurality of insertion selection control rods 4, similarly, the neutron flux average device 12A obtains the average LPRM signals at the positions A, B, C, and D of each of the four LPRM assemblies 5A, 5B, 5C, and 5D and stores the obtained average LPRM signals in the storage device.

One neutron flux ratio calculation device 13A reads the average LPRM signals at the positions A, B, C, and D from the storage device for one of the plurality of insertion selection control rods 4 simultaneously inserted, and calculates the neutron flux ratios $B_A/A_A$, $C_A/A_A$, and $D_A/A_A$. Further, one rod insertion block 14A reads and inputs the neutron flux ratios $B_A/A_A$, $C_A/A_A$, and $D_A/A_A$ for one of the plurality of insertion selection control rods 4 simultaneously inserted, and determines whether the maximum neutron flux ratio out of these neutron flux ratios exceeds the set neutron flux ratio. The rod insertion blocks 14A outputs the signal "1" which is the rod insertion block signal 48 which blocks the insertion of the insertion selection control rod 4 when the maximum neutron flux ratio exceeds the set neutron flux ratio, and outputs the signal "0" which is a non-rod insertion block signal which does not block the insertion of the insertion selection control rod 4 when the maximum neutron ratio does not exceed the set neutron flux ratio.

The local range rod insertion monitor 11A can reduce the number of neutron flux average devices 12A, neutron flux ratio calculation devices 13A, and rod insertion blocks 14A, respectively, thereby simplifying the configuration.

Second Embodiment

A control rod operation monitoring method according to a second embodiment of the present invention which is another preferred embodiment of the present invention will be described below with reference to FIG. 3.

Figure 3:
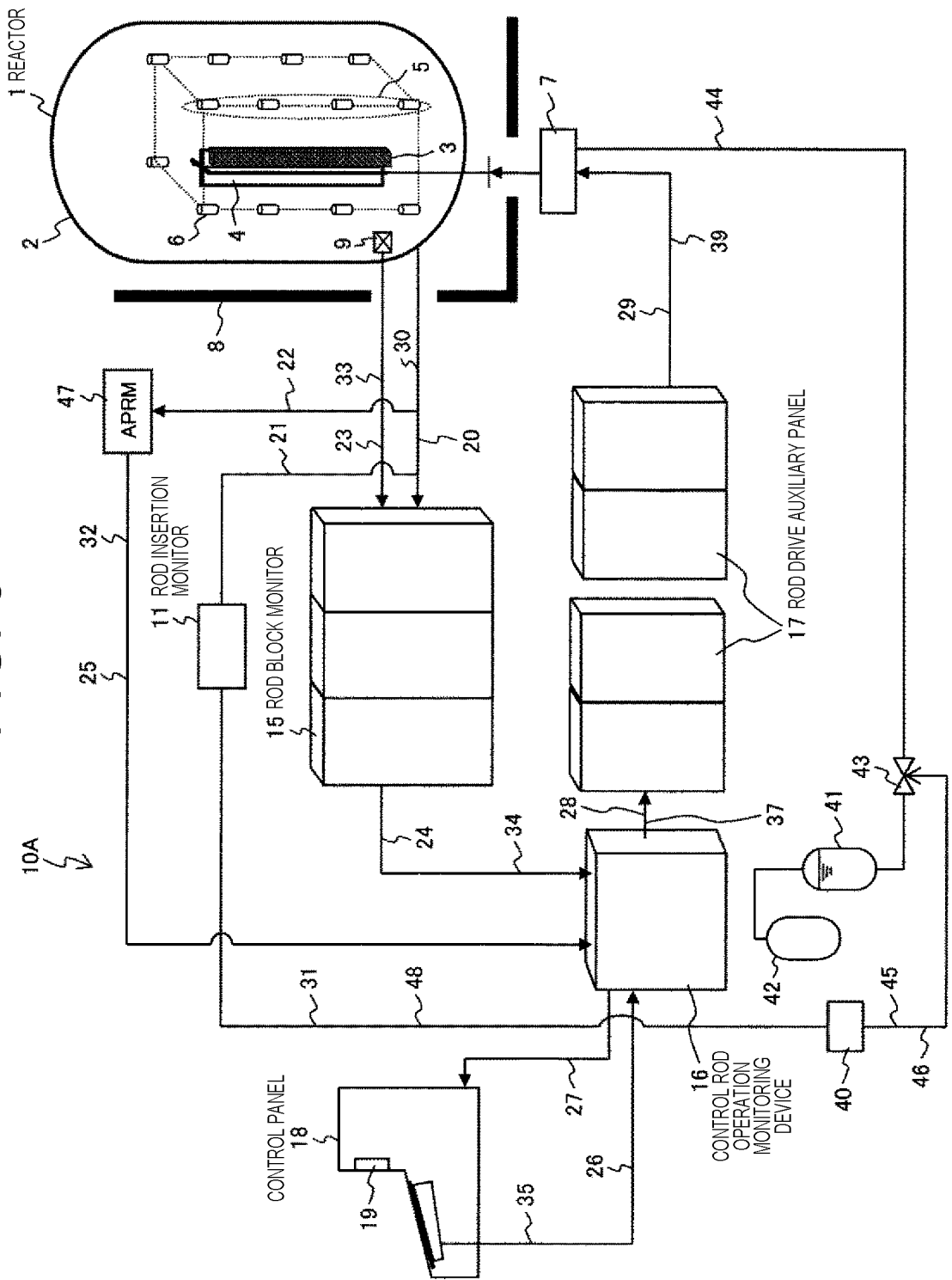
FIG. 3 is a configuration diagram showing a control rod operation monitoring system according to a second embodiment which is another preferred embodiment of the present invention.

As shown in FIG. 3, a control rod operation monitoring system 10A used in the control rod operation monitoring method of the second embodiment includes a rod insertion monitor 11, a rod block monitor 15, a control rod operation monitoring device 16, a rod drive auxiliary panel 17, and a scram control device 40.

Such a control rod operation monitoring system 10A has a configuration in which the scram control device 40 is added to the control rod operation monitoring system 10 of the first embodiment. The scram control device 40 is connected to the rod insertion monitor 11 via a wiring 31, specifically, an OR circuit 50 of the rod insertion monitor 11. In addition, the scram control device 40 is connected to a scram valve 43 via a wiring 45. Other components according to the scram control device 40 of the control rod operation monitoring system 10A are the same as the components of the control rod operation monitoring system 10.

In the control rod operation monitoring method of the second embodiment, the control rod operation monitoring system 10A functions in the same way as the control rod operation monitoring system 10. The rod insertion monitor 11 and the rod block monitor 15 of the control rod operation monitoring system 10A are operated in the same way as the rod insertion monitor 11 and the rod block monitor 15 of the control rod operation monitoring system 10, and the rod insertion monitor 11 outputs the rod insertion block signal 48 and the rod block monitor 15 outputs the rod withdrawal block signal 34.

When the rod insertion block signal 48 is output from an OR circuit 49 of a local range rod insertion monitor 11A of the rod insertion monitor 11, even which the rod insertion block signal 48 is not output from a rod insertion block 14B of a wide range rod insertion monitor 11B, the rod insertion block signal 48 is output from an OR circuit 50 of the rod insertion monitor 11. This rod insertion block signal 48 output from the OR circuit 50 is input to the scram control device 40. The scram control device 40 to which the rod insertion block signal 48 is input outputs a scram signal 46 transmitted to the scram valve 43 via a wiring 45. The scram signal is transmitted to the scram valve 43 which is provided in each scram line 44 connected to an accumulator 41 of all hydraulic control units. By doing so, high-pressure driving water within each accumulator 41 is supplied to all CRDs 7 by opening all the scram valves 43, all control rods 4 are urgently inserted into a core, and a reactor is scrammed.

When the rod insertion block signal 48 is output from a rod insertion block 14B of a wide range rod insertion monitor 11B, even which the rod insertion block signal 48 is not output from the OR circuit 49 of the local range rod insertion monitor 11A of the rod insertion monitor 11, the rod insertion block signal 48 is output from the OR circuit 50 of the rod insertion monitor 11. Even in this case, the high-pressure driving water within each accumulator 41 is supplied to all the CRDs 7 by opening all the scram valves 43, all the control rods 4 are urgently inserted into the core, and the reactor is scrammed.

In the second embodiment, each effect generated in the first embodiment can be obtained. Further, in the second embodiment, since the rod insertion block signal 48 output from the rod insertion monitoring 11 is input to the control device 40, the reactor can be scrammed earlier than in the first embodiment.

In the second embodiment, since the operation of inserting the plurality of insertion selection control rods 4 into the core by driving the motor of the corresponding CRD 7 is switched to the urgent insertion operation of all the control rods 4 by supplying the high-pressure driving water from the accumulator 41 to all the CRDs 7, substantially, the operation of blocking the plurality of insertion selection control rods 4 simultaneously inserted into the core from being inserted is performed based on the rod insertion block signal 48 as in the first embodiment.

Each of the above-described embodiments is an example applied to ABWR provided with a motor-driven type CRD 7. Each of the control rod operation monitoring systems 10 and 10A which are applied to each embodiment may be applied to a boiling water reactor (for example, BWR-5) equipped with a CRD which performs the operation of the control rod at the time of controlling the power of the normal reactor and the operation of the control rod at the time of the urgent insertion by the pressure of the driving water.

REFERENCE SIGNS LIST

1 reactor
2 reactor pressure vessel
3 fuel assembly
4 control rod
5 local power range monitoring system assembly (neutron detector assembly)
6 local power range monitoring system (neutron detector)
7 control rod drive
10, 10A control rod operation monitoring system
11 rod insertion monitor
11A local range rod insertion monitor
11B wide range rod insertion monitor
12A, 12Aa, 12Ab, 12Ac, 12Ad, 12Ba, 12Bb, 12Bc, 12Bd neutron flux average device
13A, 13B neutron flux ratio calculation device
14A, 14B rod insertion block
15 rod block monitor
16 control rod operation monitoring device
18 control panel
40 control device
41 accumulator
43 scram valve
44 scram line
49, 50 OR circuit
51 neutron flux ratio calculation unit

The invention claimed is:

1. A control rod operation monitoring method of monitoring a plurality of control rods inserted into a core,
wherein a plurality of neutron detector assemblies, each including a plurality of neutron detectors arranged in an axial direction of the core, are disposed adjacent to each of the control rods, including insertion selection control rods selected from the plurality of control rods for insertion into the core,
wherein first neutron detectors, of the plurality of neutron detectors, are respectively arranged at first positions in each said neutron detector assembly and a plurality of second detectors, of the plurality of neutron detectors, are respectively arranged at second positions in each said neutron detector assembly,
wherein each said first position in each said neutron detector assembly is closest to a control rod insertion end of the core, and
wherein each said second position in each said neutron detector assembly is different in the axial position from the first position, the method comprising:
for each one of the plurality of insertion selection control rods, calculating a first average neutron flux of neutron fluxes measured from each of said first neutron detectors in each of said neutron detector assemblies disposed adjacent to the one insertion selection control rod;
for each one of the plurality of insertion selection control rods, calculating a second average neutron flux of neutron fluxes measured from each of said second neutron detectors in each of said neutron detector assemblies disposed adjacent to the one insertion selection control rod;
for each one of the plurality of insertion selection control rods, calculating a first neutron flux ratio, each said first neutron flux ratio being a ratio of the second average neutron flux with respect to said first average neutron flux; and
upon determining the first neutron flux ratio of one of the insertion selection control rods exceeds a predetermined neutron flux ratio, generating a rod insertion block signal for the one insertion selection control rod.

2. The control rod operation monitoring method according to claim 1, comprising: averaging neutron fluxes measured by the neutron detectors located at the first positions of each of all the neutron detector assemblies arranged in the core; averaging neutron fluxes measured by the neutron detector located at the second positions of each of all the neutron detector assemblies; calculating a second neutron flux ratio which is a ratio of an average of the neutron fluxes at the second positions of all the neutron detector assemblies with respect to an average of the neutron fluxes at the first positions of all the neutron detector assemblies; and generating rod insertion block signals for all control rods including the ones of the insertion selection control rods in the core when the second neutron flux ratio exceeds a set neutron flux ratio.

3. The control rod operation monitoring method according to claim 2, wherein all the control rods including the insertion selection ones of the control rods are blocked from being inserted into the core by the rod insertion block signal when the second neutron flux ratio exceeds the set neutron flux ratio.

4. The control rod operation monitoring method according to claim 1, wherein the one insertion selection control rod is blocked from being inserted into the core by the rod insertion block signal.

5. The control rod operation monitoring method according to claim 4, wherein after the one insertion selection control rod is blocked from being inserted into the core, all the control rods are urgently inserted into the core.

6. The control rod operation monitoring method according to claim 1, wherein all the control rods are urgently inserted into the core by the rod insertion block signal.

* * * * *